United States Patent
Gow et al.

(10) Patent No.: US 8,912,944 B2
(45) Date of Patent: Dec. 16, 2014

(54) HUMAN PRESENCE DETECTOR SUITABLE FOR CONCEALMENT AND USING A SHAPED MICROWAVE BEAM

(76) Inventors: Thomas W. Gow, Elkton, SD (US); Edward L. Schwarz, Minneapolis, MN (US)

( * ) Notice: Subject to any disclaimer, the term of this patent is extended or adjusted under 35 U.S.C. 154(b) by 251 days.

(21) Appl. No.: 13/417,874

(22) Filed: Mar. 12, 2012

(65) Prior Publication Data

US 2012/0229324 A1 Sep. 13, 2012

Related U.S. Application Data

(60) Provisional application No. 61/451,819, filed on Mar. 11, 2011.

(51) Int. Cl.
*G01S 13/04* (2006.01)
*G01S 7/02* (2006.01)
*G01S 7/03* (2006.01)
*G01S 13/00* (2006.01)

(52) U.S. Cl.
CPC ........ *G01S 7/032* (2013.01); *G01S 13/04* (2013.01)
USPC ............... 342/27; 342/21; 342/22; 342/82; 342/89; 342/175; 342/176; 342/179

(58) Field of Classification Search
USPC .............. 342/21, 22, 27, 28, 82, 89, 94, 175, 342/198, 176, 179, 350, 351; 343/700 R, 343/841, 842, 907, 909; 333/24 R, 32, 333/33–35; 455/7, 19; 359/237, 238, 240, 359/241, 362, 364, 365, 366; 398/118; 607/1, 115, 154–156; 250/336.1, 250/338.1, 330, 370.01, 370.11; 315/246, 315/248; 356/3, 4.01, 5.01, 5.03
See application file for complete search history.

(56) References Cited

U.S. PATENT DOCUMENTS

| | | | | | |
|---|---|---|---|---|---|
| 3,584,934 | A | * | 6/1971 | French | 359/241 |
| 3,719,922 | A | * | 3/1973 | Lopes et al. | 342/179 |
| 4,358,744 | A | * | 11/1982 | Tikes | 333/33 |
| 4,364,631 | A | * | 12/1982 | Arondel et al. | 359/366 |
| 4,589,424 | A | * | 5/1986 | Vaguine | 607/154 |
| 4,600,840 | A | * | 7/1986 | Chutjian | 250/338.1 |
| 5,121,124 | A | * | 6/1992 | Spivey et al. | 342/179 |
| 5,365,237 | A | * | 11/1994 | Johnson et al. | 342/179 |
| 5,579,024 | A | * | 11/1996 | Sureau | 343/909 |
| 5,760,397 | A | * | 6/1998 | Huguenin et al. | 250/336.1 |
| 5,999,122 | A | * | 12/1999 | Shoucri et al. | 250/336.1 |
| 6,180,946 | B1 | * | 1/2001 | Ebstein | 250/370.11 |

(Continued)

FOREIGN PATENT DOCUMENTS

GB 955822 A * 4/1964

*Primary Examiner* — Bernarr Gregory
(74) *Attorney, Agent, or Firm* — Nawrocki, Rooney & Sivertson, P.A.

(57) ABSTRACT

A presence detector unit (PDU) of the type relying on microwave radiation provides a signal indicating movement within a defined space when such movement occurs. A source of microwave radiation within a housing projects a beam of microwave radiation directed through a side of the housing to suffuse at least a portion of the defined space. A detector within the housing senses changes in microwave radiation reflected back toward the detector. An adjustable beam occlusion structure is supported by the housing and blocks a portion of the microwave radiation emanating from the source and through the side of the housing.

13 Claims, 8 Drawing Sheets

(56) References Cited

U.S. PATENT DOCUMENTS

| | | | |
|---|---|---|---|
| 6,563,462 B1 * | 5/2003 | Moffa et al. | 342/351 |
| 6,822,622 B2 * | 11/2004 | Crawford et al. | 343/909 |
| 6,870,162 B1 * | 3/2005 | Vaidya | 250/330 |
| 6,878,939 B2 * | 4/2005 | Vaidya | 250/336.1 |
| 6,900,438 B2 * | 5/2005 | Vaidya et al. | 250/336.1 |
| 6,933,683 B2 * | 8/2005 | Borsuk et al. | 315/248 |
| 7,075,080 B2 * | 7/2006 | Vaidya | 250/336.1 |
| 7,548,190 B2 * | 6/2009 | Baldi | 342/175 |
| 7,554,652 B1 * | 6/2009 | Babin et al. | 356/5.03 |
| 7,679,546 B2 * | 3/2010 | Bublitz et al. | 342/22 |
| 7,756,471 B2 * | 7/2010 | Alamouti et al. | 455/19 |
| 7,956,794 B2 * | 6/2011 | Skultety-Betz et al. | 342/22 |
| 7,973,704 B2 * | 7/2011 | Storz et al. | 342/175 |
| 7,978,145 B2 * | 7/2011 | Hauhe et al. | 343/841 |
| 8,067,996 B2 * | 11/2011 | Hillman et al. | 342/198 |
| 8,433,198 B2 * | 4/2013 | McFadden | 398/118 |

* cited by examiner

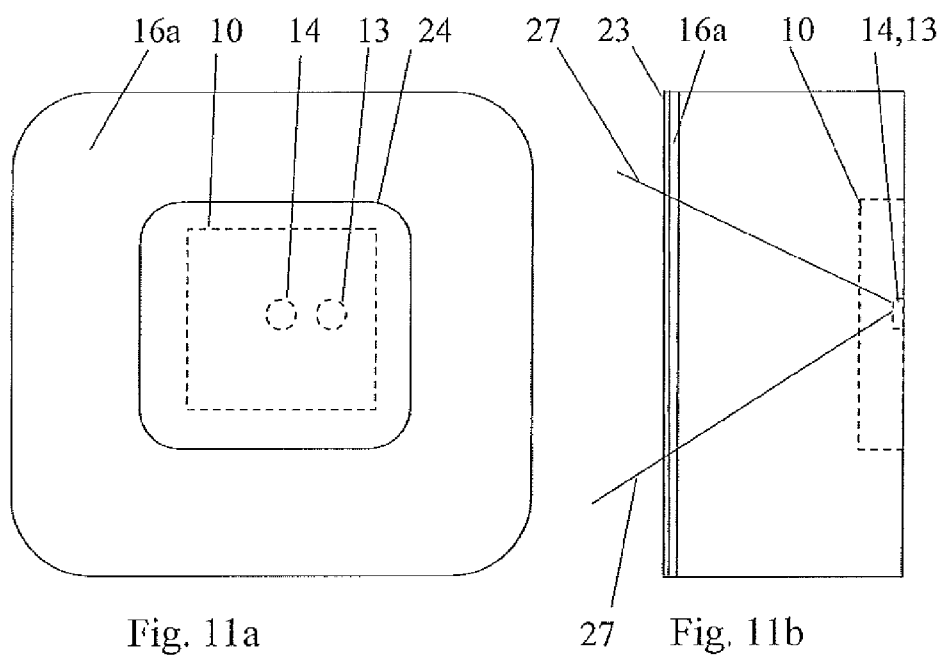

HUMAN PRESENCE DETECTOR SUITABLE FOR CONCEALMENT AND USING A SHAPED MICROWAVE BEAM

CROSS-REFERENCE TO RELATED APPLICATIONS

This is a regular application filed under 35 U.S.C. §111(a) claiming priority, under 35 U.S.C. §119(e)(1), of provisional application Ser. No. 61/451,819, previously filed Mar. 11, 2011 under 35 U.S.C. §111(b).

BACKGROUND OF THE INVENTION

It is often useful to sense entry into (or exit from) a room or other building space by a person, or simply presence of a person in the space. This may be for security purposes, or to detect human presence in or near the room in order to activate lights, open doors, or activate heat for the space. Existing entry and occupancy detectors (hereafter "motion detectors") use at least five ways to detect passage or impending passage of a person through a door, or presence of a person in a room.

Some systems use infra red (IR) sensing with a sensor that detects the changes in IR strength that a heat source such as a human body causes. Similar to this are detectors that rely on changes to ambient visible light that a moving human body causes to sense presence of that body.

Other systems rely on sounds or air pressure changes that an approaching person or animal might cause. Such audio-based systems often signal presence of a human when in fact, the sound could be from a completely extraneous source such as plumbing or a passing auto.

These are passive systems, in that they rely on some existing energy level whose detectable changes related to movement or other activity of the body that indicate human presence or passage. Think of the automatic door openers in supermarkets as one example. To some extent, this passive detection is advantageous, say when such a system properly detects continued presence of a person in the room. However, such systems may generate many false positives and false negatives.

Other systems are active systems having a source of some type of beam or energy whose changes in level caused by human movement can be detected by a sensing element. Such systems typically use a dedicated source producing IR, ultrasonic (sound), or microwave signals. In general such sensing elements use interruption of or other change in the IR, ultrasound, or microwave signal as the basis for detecting entry, exit, or presence of a body.

A common problem with these active systems is that often the signal source and the sensor element are mounted on the surface of the wall. This may be unappealing esthetically for some, and in any case lends itself to inadvertent damage or vandalism.

One such active system now available uses a microwave radiation source, typically a laser diode, for the energy whose change is detectable to indicate nearby motion. Microwave radiation is sometimes defined as electromagnetic radiation in the 0.3-300 ghz range. For purposes of this document, the term "microwave radiation" includes any electromagnetic radiation that can penetrate non-metallic sheets or layers with relative ease, but is substantially attenuated by metallic sheets or layers.

A preferred unit now available comprises a single combined occupancy detector module holding both the source and the sensing element. The sensing element relies on changes in the backscatter and reflection of a portion of the radiation to indicate a person's approach. For entry and exit detection, such a module may be positioned near a door so that an approaching person will be detected, and an automatic opener activated. Such a unit has a sensitivity adjustment to allow for differing requirements in different applications. One such unit uses a 5.8 ghz radiation source.

In many ways, an active system based on microwave energy is ideal for sensing movement, since one can be confident that the only source for the microwave energy is that associated with the system. The components of such a system are relatively inexpensive and reliable.

The disadvantage of an active microwave-based system is that the energy from the microwave source will propagate over a wide area. Microwave radiation is not easily focused by the source, so it can easily reach into a neighboring space. Movement in such a neighboring space is then sensed, creating false positives. There are possible solutions to this problem but these may be difficult to implement in the field. For example, sensitivity adjustment of the unit may eliminate most of these false positives, but may also then produce some false negatives, that is where indications of movement should be but are not detected.

Current microwave Doppler signal type of occupancy sensors are inherently subject to uncontrolled coverage and cannot effectively operate only when actually needed within a room where installed. The ability of the microwave signal to pass through the typical stud and gypsum board constructed wall regardless of location results in nuisance light activations. This characteristic has eliminated the market interest for using this sensing method in most of the occupancy sensor room lighting installations.

These microwave sensors have adjustable sensitivity but since the microwave coverage cannot be limited to a single room, or a well-defined footprint, nuisance tripping occurs. Present designs are successful only if the sensor is centrally located within a symmetrical dimensioned room. Even then, the sensitivity must be adjusted for the room boundaries. These considerations limit the installations where this type of occupancy sensor can be used.

Architects and interior designers consider exposed occupancy sensors to be very unattractive architecturally. A completely concealed sensor will be preferred in many cases.

Building codes include the use of occupancy sensors within rooms as a "green" energy saving measure to replace manual switches. Also, occupancy sensors remove the chances of unsupervised access to public area lighting. This means at least one occupancy sensor device per room, and in larger rooms, such as open office areas many occupancy sensors will be required to be evenly spaced throughout the ceiling area for proper coverage to detect the presence of any movement/activity within the room to continue to maintain power to the room lighting fixtures.

BRIEF DESCRIPTION OF THE INVENTION

A presence detector unit (PDU) of the type relying on microwave radiation provides a signal indicating movement within a defined space when such movement occurs. Such a PDU has a housing having an interior space, at least a portion of which is made from material that blocks microwave radiation. The housing has a first side substantially transparent to microwave radiation.

A source of microwave radiation within the housing forms a beam of microwave radiation directed through the first side. The housing also encloses a detector of changes in microwave radiation produced by the microwave radiation source.

The housing supports an adjustable beam occlusion structure (ABOS) that blocks a portion of the microwave radiation emanating from the source and through the first side. In one embodiment the PDU has an ABOS comprising at least one shutter movable within the microwave radiation beam. One form of this shutter has a slot through which a fastener passes to attach the shutter to the housing.

Preferably, the shutter has a pair of parallel slots with a fastener passing though each slot and attached to the housing to hold the shutter in a desired position. The PDU may include four substantially rectangular shutters arranged around the periphery of the first side. Each shutter may have a pair of substantially parallel slots. A pair of fasteners is associated with each shutter. Each fastener passes though one slot of the shutter and attaches to the housing.

In some designs, an edge of the shutter within the beam may be other than a straight line. A shutter may also have an interior opening within the beam.

In another version, the PDU housing has a plate transparent to microwave radiation overlying the first side. The ABOS for this version comprises a metallic foil adhering to the plate and blocking the microwave radiation, said metallic foil having an opening within the beam. The metallic foil may detachably adhere to the plate with an adhesive, to allow a portion of the foil to be removed during installation to create a desired opening within the microwave radiation beam.

BRIEF DESCRIPTION OF THE DRAWINGS

FIGS. 11a and 11b are front and side projective views of an alternate embodiment for defining the space receiving microwave radiation.

DESCRIPTION OF THE PREFERRED EMBODIMENTS

Figure 1:
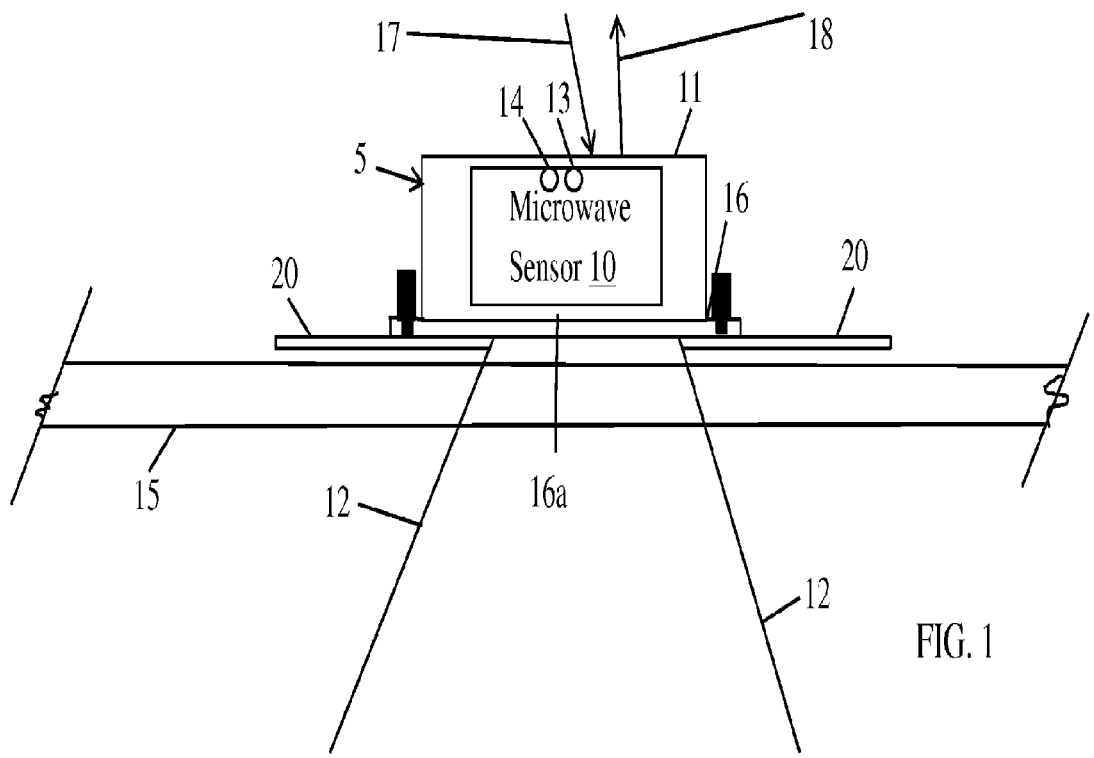
FIG. 1 is a side elevation view of one version of the presence detector unit as typically mounted above a ceiling.

FIGS. 1 and 3-5 may be considered together. As best seen in FIG. 1, the presence detector unit (PDU) 5 includes a rectangular housing or box 11 in which is mounted a typical occupancy detector module 10 of the type discussed above. In many installations, PDU 5 will be mounted above a ceiling 15. A port for accessing PDU 5 may be provided. PDU 5 can be mounted above common accessible suspended ceiling systems with a standard industry T bar bracket mounting kit.

Module 10 includes a microwave radiation source 13 which may comprise a microwave laser diode emitting approximately 5.8 ghz microwave radiation. Module 10 has a side 16 from which diode 13 microwave radiation emanates to thereby suffuse the space which side 16 faces. Side 16 may be open or comprise a plate 16a transparent to microwave radiation over at least a part of its surface. Plate 16a will then complete enclosing of the space in housing 11.

Changes in backscatter and reflected microwave radiation resulting from movement within the space is detected by a detector 14 forming a part of module 10, which detector may be a photodiode. Circuitry, not shown, provides power to diode 13 and to a circuit, also not shown, that receives the signal from detector 14 and provides an occupancy signal on a path 18. In general, such a module 10 emits microwave radiation that emanates in a diverging conical pattern at 12 with an apex angle of 60° or more as shown in FIG. 1. Thus, the radiation emitted disperses over a substantial area on the surfaces facing module 10. Movement of anything within that conical pattern will typically be detected by module 10.

Housing 11 may be a standard metal electrical box commonly used for wiring. Housing 11 should be of the type that allows little microwave radiation to escape through its sides. The interior of housing 11 may be coated with microwave-absorbent material to prevent reflection of radiation within the housing 11 to detector 14.

Figure 2:
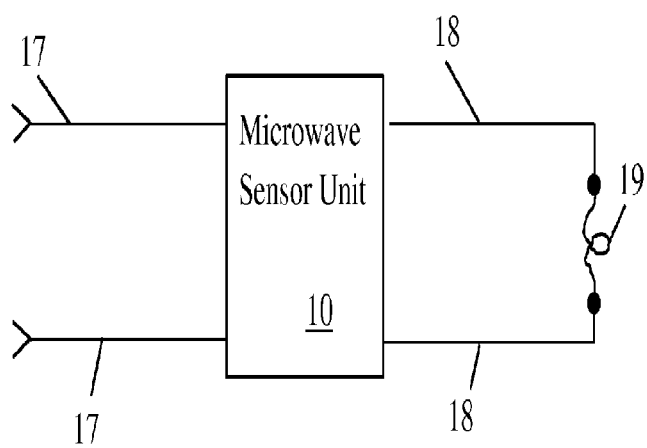
FIG. 2 is a simplified block diagram of the connections for the presence detector unit.

The simplified block diagram of FIG. 2 shows power for module 10 provided on a pair of conductors 17. When nearby motion is detected a control signal on a pair of conductors 18 activates a unit 19 for any desired activity.

Figure 3:
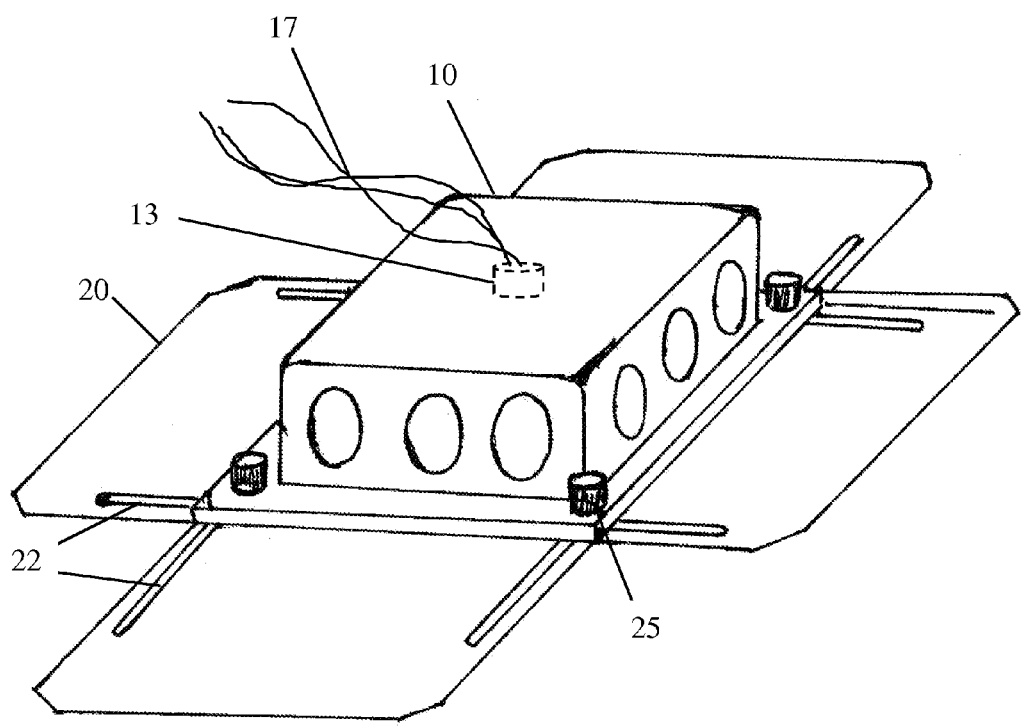
FIG. 3 is a first perspective view of the occupancy unit.
Figure 4:
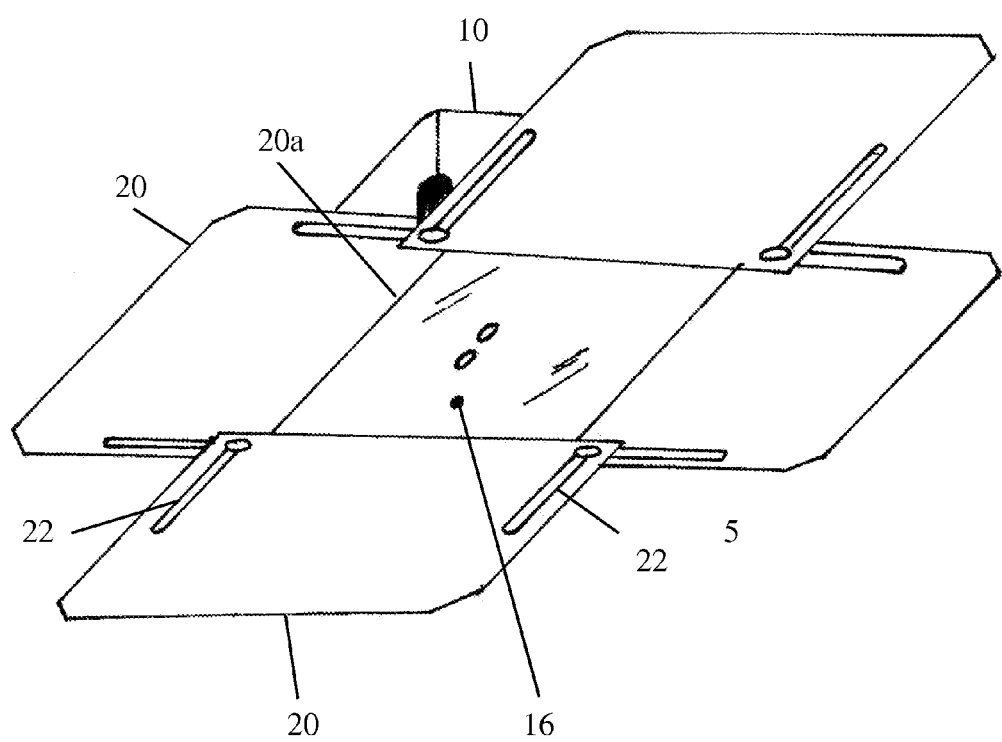
FIG. 4 is a second perspective view of the occupancy unit.
Figure 5:
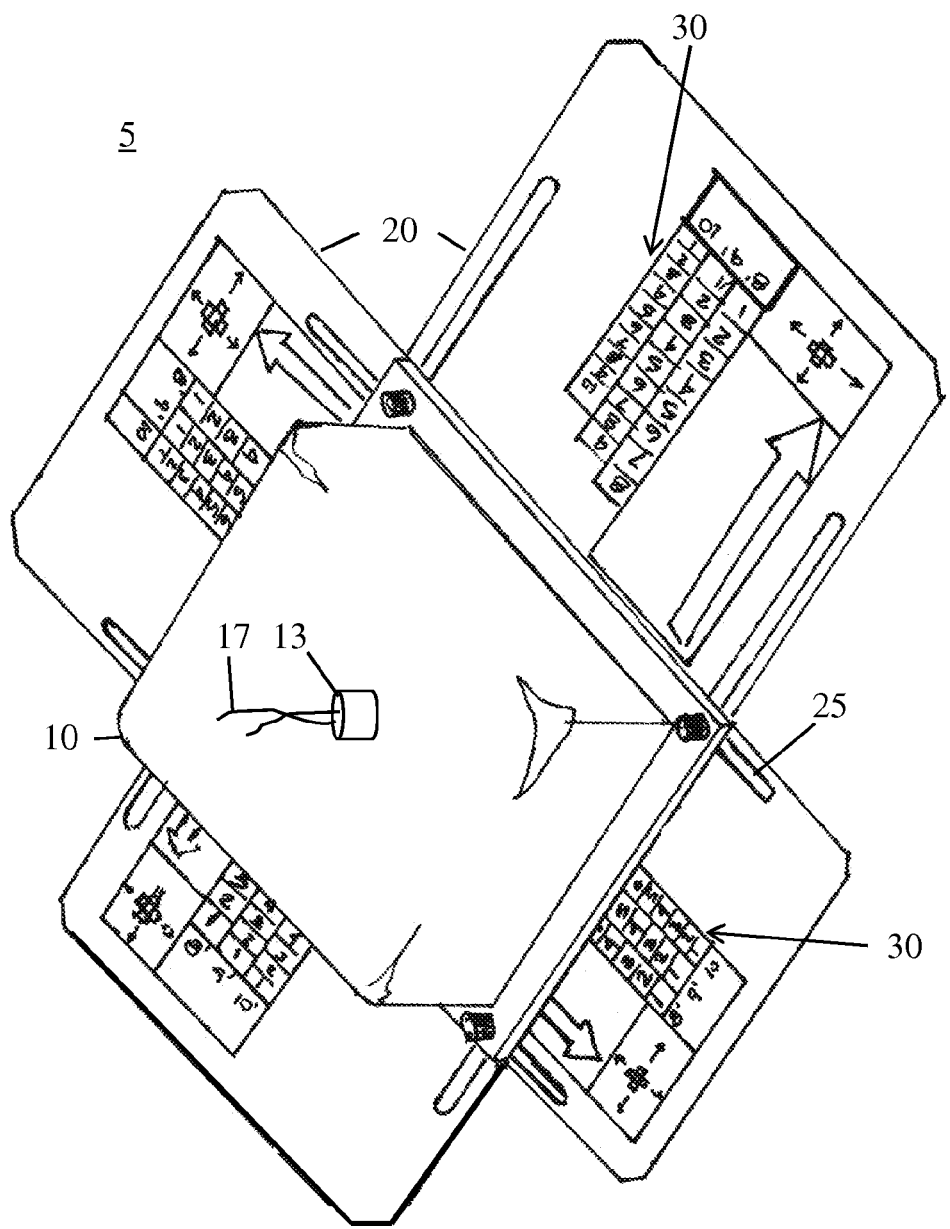
FIG. 5 is a third perspective view of the occupancy unit.

One version of PDU 5 has in the perspective views of FIGS. 3-5 a first embodiment for an adjustable beam occlusion structure (ABOS) that blocks a portion of the microwave radiation from source 13. In this embodiment four (typically rectangular) shutters 20 made of a material that substantially attenuates microwave radiation impinging on them. Suitable materials include steel, or plastic with a metallic paint on the surface or metallic particles embedded therein.

In some circumstances, microwave radiation may reflect back to the detector 14 and cause false positives. To address this issue preferably the ABOS, the shutters 20 in this embodiment, includes on the side thereof facing the microwave source 13, microwave-absorbent material.

Edges 20a of shutters 20 define the area of the space in which the microwave impinges. Usually edges 20 are straight lines, but may also be curved or comprises two or more intersecting straight lines to match the area blanketed by radiation to the shape of the space in which PDU 5 is installed.

Housing 11 has threaded or spring-loaded connectors 25 that in the embodiment shown attach at the corners of housing 11. Shutters 20, each having a pair of parallel slots 22, are fastened to housing 11 by connectors 25 passing through these slots 22. This arrangement places shutters 20 in approximate parallel alignment with side 16 of housing 11. Shutters 20 can be independently shifted toward the center of side 16 to partially occlude a portion of operating side 16, thereby reducing the cross section size and apex angle of the radiation projected from housing 11 and through side 16.

A preferred installation of PDU 5 places it behind a panel such as ceiling 15 (FIG. 1) or wall (FIG. 9) that is transparent to microwave radiation. PDU 5 may be connected by path 18 to any desired device, such as a light or door opener. When so positioned behind the enclosing panel PDU 5 is completely invisible to occupants of the space.

By configuring the ABOS properly, the footprint created by the emitted microwave radiation can be made to almost exactly match the periphery of the space's floor.

Figure 10:
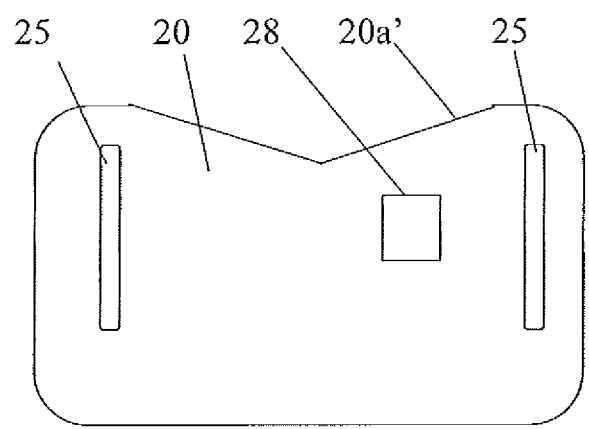
FIG. 10 shows an alternate version of a shutter.

FIG. 10 shows a variant of a rectangular shutter 20 having an edge 20a that is not a straight line. Shutter 20 also has an opening 28 through which radiation may pass. Either or both of these variants will change the footprint within which movement is detected.

Figure 6:
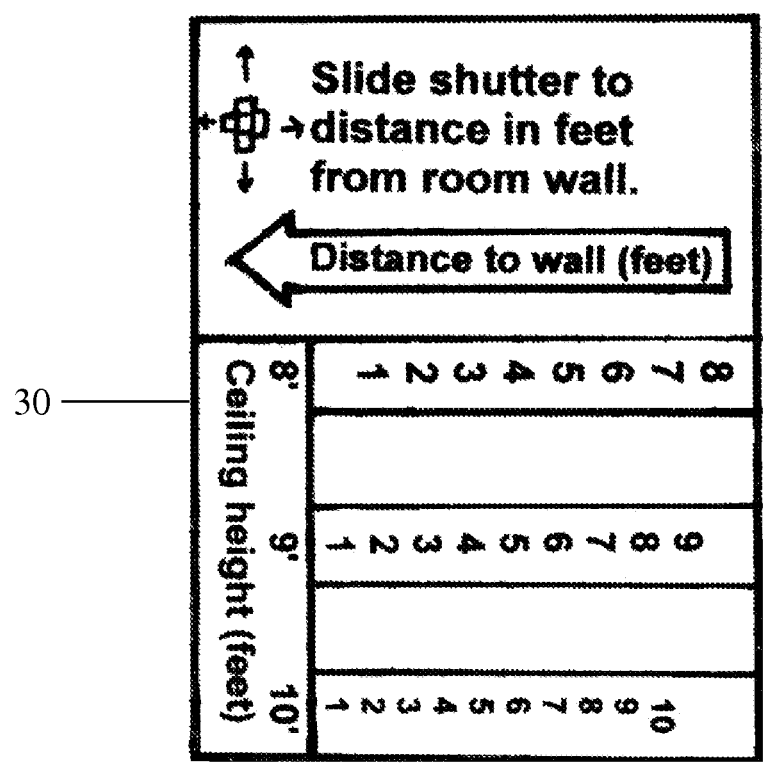
FIG. 6 shows one type of legend that may be placed on a shutter forming a part of the presence detector unit.

FIG. 5-8 show shutters with printed legends in the nature of scales on the backs thereof that assist a person in positioning shutters 20 when installing a PDU 5. FIGS. 5 and 6 show one version of a PDU 5 having four shutters 20 with scales 30 on each to allow selection of an approximately correct shutter 20 position on housing 11.

Each shutter 20 has on its upper surface, a chart 30 showing defined increments based on the distances from the sensor 5 of each of the four walls of the room and of the ceiling height. Each of the four (4) shutters 20 individually define the microwave beam cutoff of each of the four walls.

Figure 7:
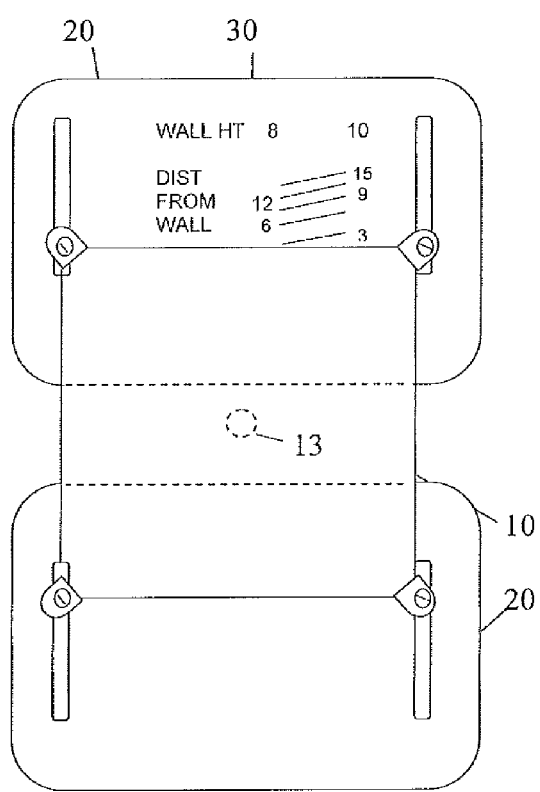
FIG. 7 is a back elevation view of the presence detector unit, showing another type of legend that may be placed on a shutter forming a part of the presence detector unit.
Figure 8:
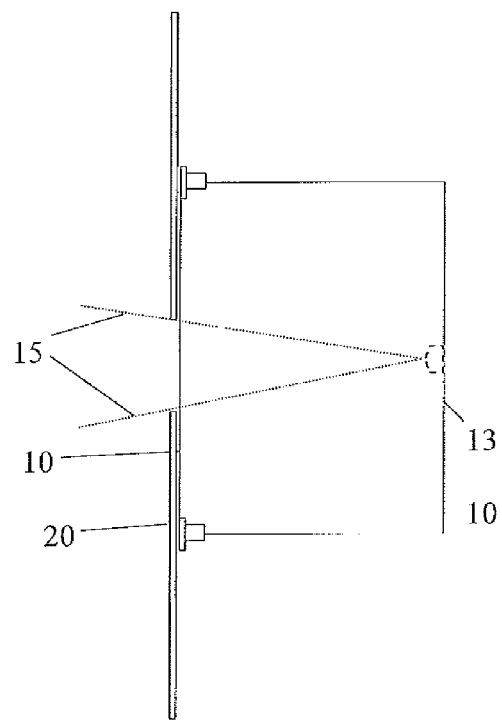
FIG. 8 is a side elevation view of the presence detector unit of FIG. 7.

FIGS. 7 and 8 show a version of shutter 20 with a scale 30' incorporating both floor shape and size and ceiling height in positioning the shutter 30. The distance d shown in FIG. 8 determines the numeric values shown by scales 30 and 30'. These numeric values can be determined either from the geometric considerations and the characteristics of detector 13, or can be determined empirically.

Figure 9:
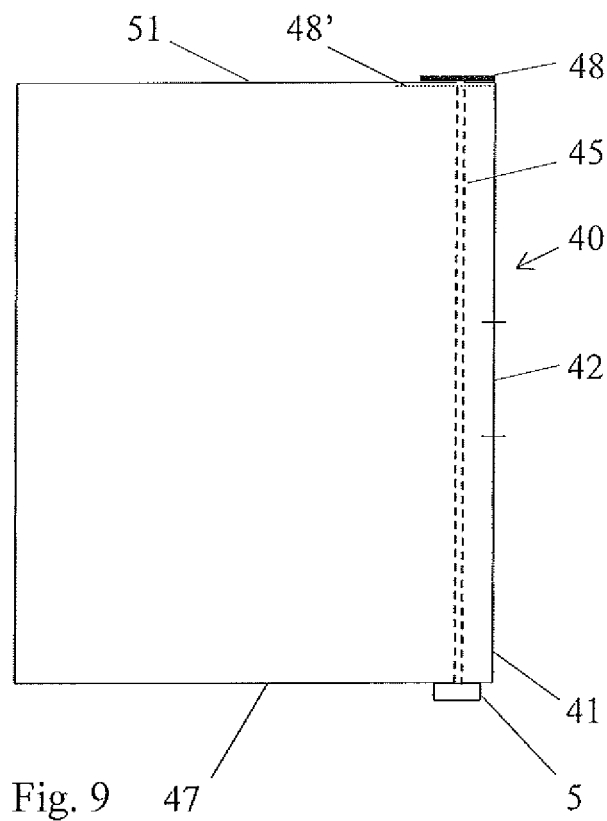
FIG. 9 is a bird's eye view of a room shows the presence detector unit installed in a configuration allowing entry and exit detection.

FIG. 9 shows a footprint view of a room or space 40 incorporating a further application for a PDU 5. Room 40 has a wall 41 with an entry area 42 such as a door. In this configuration, unit 5 can function as an intrusion or entry detector. Such a configuration substantially reduces the potential for tampering, which is a ever-present problem for exposed sensors, particularly when at waist or knee level.

PDU 5 is mounted behind a wall 47 adjoining wall 41 and directs its microwave beam 45 toward a metallic or other beam occlusion material such as target 48 that blocks beam 45. Target 48 is mounted on or within a wall 51 that faces wall 47. The position of PDU 5 and target 48 causes beam 45 to pass by entry area 42 so that anyone entering room 40 through area 42 will trigger motion detection. Target 48 prevents the beam from entering any neighboring space where movement would produce a false positive for entry into room 40.

Target 48 may comprise a metal sheet mounted behind wall 51, or a suitable metallic paint 48' on the interior surface of wall 51. The shutters 20 may be positioned to provide a beam 45 whose cross section may either have a narrow shape with a relatively long vertical axis or a small square or rectangular shape. PDU 5 preferably provides a relatively narrow beam 48, at least in the central portion of an unobstructed beam 48.

FIGS. 11a and 11b show a further type of ABOS for blocking a portion of the microwave radiation emanating from source 13. In this second embodiment of the invention instead of shutters 20, metal foil 23 is adhesively attached to the plate 16a. Metal foil 23 has a window 24 through which microwave radiation easily passes, see FIG. 11a. Foil 23 however, is thick enough to substantially block all microwave radiation, thereby creating a diverging beam defined by outer rays 27 passing through window 24.

Foil 23 may be shipped with a PDU 5 and then cut to shape before attaching to plate 16a. In another embodiment, foil 23 may be adhered to plate 16a at the factory with adhesive that allows detaching or peeling away a portion of the foil 23 from the plate 16a during installation in order to create a window 24 that properly shapes and directs the microwave radiation beam. In such an embodiment, the installer can score foil 23 to create the desired window 24, and then peel away the scored foil 23 material.

Regardless of the type of ABOS, installation above an accessible suspended ceiling or gypsum board (wallboard) ceiling will still allow "unobstructed" signal sensing coverage by the PDU 5. This arrangement allows a custom coverage of each room configuration without nuisance sensing caused by outside-the-room activities.

What is claimed is:

1. A presence detector unit (PDU) of the type relying on microwave radiation, and providing a signal indicating movement within a defined space when such movement occurs, comprising:
   a) a housing having an interior space, at least a portion of which is made from material that blocks microwave radiation, and having a first side substantially transparent to microwave radiation;
   b) a source of microwave radiation within the housing and forming a beam of microwave radiation directed through the first side;
   c) a detector of changes in microwave radiation outside the housing; and
   d) an adjustable beam occlusion structure (ABOS) supported by the housing and blocking a portion of the microwave radiation emanating from the source and through the first side, and including at least one shutter movable within the microwave radiation beam, said shutter having a slot, and said shutter further including a fastener passing through the slot and attached to the housing.

2. The PDU of claim 1, wherein the shutter has a pair of parallel slots, and a pair of fasteners, each fastener passing though one slot of the shutter and attached to the housing.

3. The PDU of claim 2, including four substantially rectangular shutters arranged around the periphery of the first side, wherein each shutter has a pair of substantially parallel slots, and associated with each shutter, a pair of fasteners, each fastener passing though one slot of two shutters and attached to the housing.

4. The PDU of claim 2, wherein an edge of the shutter within the beam is other than a straight line.

5. The PDU of claim 2, wherein the shutter has an interior opening for allowing passage of the beam.

6. The PDU of claim 1, wherein the ABOS includes on the side thereof facing the microwave source, microwave-absorbent material.

7. The PDU of claim 1 wherein the shutter has on a side, a scale relating shutter position relative to the housing and area covered by the beam.

8. The PDU of claim 7, wherein the scale on the shutter further relates shutter position relative to the housing to the distance of the housing from a floor of the defined space.

9. A presence detector unit (PDU) of the type relying on microwave radiation, and providing a signal indicating movement within a defined space when such movement occurs, comprising:
   a) a housing having an interior space, at least a portion of which is made from material that blocks microwave radiation, and having a first side substantially transparent to microwave radiation;
   b) a source of microwave radiation within the housing and forming a beam of microwave radiation directed through the first side;
   c) a detector of changes in microwave radiation outside the housing; and
   d) an adjustable beam occlusion structure (ABOS) supported by the housing and blocking a portion of the microwave radiation emanating from the source and through the first side, and including at least one plate transparent to microwave radiation overlaying the first side, and wherein the ABOS comprises a foil of the type blocking microwave radiation, said foil adhering to the plate, and said foil having an opening within the beam for allowing passage of a portion the beam.

10. The PDU of claim 9, wherein the foil detachably adheres to the plate with an adhesive.

11. A presence detector unit (PDU) of the type relying on microwave radiation, and providing a signal indicating movement within a defined space when such movement occurs, comprising:
   a) a housing having an interior space, at least a portion of which is made from material that blocks microwave radiation, and having a first side substantially transparent to microwave radiation;
   b) a source of microwave radiation within the housing and forming a beam of microwave radiation directed through the first side;
   c) a detector of changes in microwave radiation outside the housing; and
   d) an adjustable beam occlusion structure (ABOS) supported by the housing and blocking a portion of the microwave radiation emanating from the source and through the first side, said PDU adapted for detecting entry through a door into a space for occupancy, and further comprising:
   e) a first wall having an entry area therein;
   f) a second wall adjoining the first wall at a point spaced from the door;
   g) a third wall adjoining the first wall and spaced from the door, and placing the door between the second and third walls, said third wall supporting the PDU with the beam of microwave radiation directed to pass across the door and impinge on the second wall; and
   h) beam occlusion material on the second wall blocking passage of microwave radiation emitted by the source through the second wall.

12. The PDU of claim 11, wherein the position of the ABOS creates a narrow beam of microwave radiation.

13. The PDU of claim 11, wherein said beam occlusion material on the second wall comprises at least one of a metal sheet within the wall and metallic paint on the wall.

* * * * *